3,227,660
HIGH-SILICA MOLECULAR SIEVE ZEOLITES
Rowland C. Hansford, Yorba Linda, Calif., assignor to Union Oil Company of California, Los Angeles, Calif., a corporation of California
No Drawing. Filed Nov. 13, 1962, Ser. No. 237,390
8 Claims. (Cl. 252—455)

This invention relates to new and economical methods for the manufacture of certain crystalline molecular sieve zeolites. Specifically, the invention is concerned with the manufacture of Y sieve zeolites having a relatively high $SiO_2/Al_2O_3$ mole-ratio of between about 3.5 and 5.5.

In broad aspect the new method comprises two basic steps, viz., (1) a peptizing step wherein a silica hydrogel is partially peptized in an aqueous sodium hydroxide solution, and (2) a subsequent crystallizing step wherein the partially peptized silica suspension from step (1) is digested at relatively high temperatures with added sodium hydroxide, sodium aluminate and water to effect precipitation of the crystalline molecular sieve. The details of these steps are described hereinafter.

The invention is also concerned with new zeolite mixtures prepared by these methods, and also with hydrocracking catalysts and processes utilizing the zeolite mixtures.

Molecular sieve zeolites of the Y crystal type are described in Belgian Patent Nos. 598,582, 598,682, 598,683 and 598,686. These zeolites, though possessing a definite single crystal form, can be prepared so as to display significant differences in chemical composition, notably as to zeolite cations present, and the $SiO_2/Al_2O_3$ mole-ratio in the crystal lattice. The general formula for the sodium zeolites is expressed as follows:

$$0.9 \pm 0.2 Na_2O : Al_2O_3 : wSiO_2 : xH_2O$$

where $x=0$ to about 9 and $w=2.5$ to about 6.

The sodium in the above formula can be replaced by numerous other cations, and a unique feature of these zeolites is that the sodium can be exchanged with ammonium ion, and the resulting ammonium zeolite heated to decompose the ammonium ion, leaving a hydrogen form of the zeolite (which is sometimes referred to as being "decationized").

The Y molecular sieve zeolites are useful in many industrial applications. They can be used as absorbents to separate mixtures of compounds or to purify gas streams. They can also be used as catalysts, or bases for catalysts. In particular, it has recently been discovered that these Y molecular sieves in their hydrogen form, or in a divalent metal form such as the magnesium zeolite, are useful catalysts for isomerization, cracking, and particularly for hydrocracking. For purposes of hydrocracking or isomerization a hydrogenating metal such as palladium, platinum, or nickel is added thereto, as by impregnation or ion-exchange.

The present invention is concerned specifically with Y sieve zeolites which are particularly useful as hydrocracking catalyst bases. For purposes of hydrocracking (and other acid-catalyzed reactions such as isomerization) it is desirable to use the Y zeolites having a relatively high $SiO_2/Al_2O_3$ mole ratio of, e.g., between about 3.9 and 6. These high-silica zeolites are more stable, and produce a much more satisfactory catalyst than the zeolites having a lower $SiO_2/Al_2O_3$ mole-ratio.

The Y sieve zeolites having a $SiO_2/Al_2O_3$ mole-ratio of about 2.5 to 3.9 can be cheaply and easily prepared by methods described in Belgian Patent No. 577,642, which in general involves digesting aqueous solutions of sodium silicate and sodium aluminate at elevated temperatures, following an initial low temperature aging treatment. The raw materials required for manufacturing these low-silica zeolites are quite inexpensive. However, all attempts to prepare high-silica Y sieve zeolites, having a $SiO_2/Al_2O_3$ mole-ratio above about 3.9, directly from sodium silicate solutions have been unsuccessful.

The only successful methods heretofore proposed for the manufacture of high-silica Y zeolites have required as the major starting material a highly purified silica hydrosol. These hydrosols, as exemplified by the commercial "Ludox," are prepared by extensive ion-exchanging of sodium silicate solutions. The resulting silica hydrosols are several times as costly as sodium silicate, on an equivalent $SiO_2$ basis. According to the present invention, the use of silica hydrosols is eliminated, and the major starting material in an integrated manufacturing process may be sodium silicate (which can easily be converted to the required silica hydrogel), or of course the silica hydrogel itself may form the initial raw material.

Silica hydrogels suitable for use herein are prepared in the conventional manner, as by acidifying sodium silicate solutions to a pH below about 10, and washing and partially drying the resulting hydrogel. No expensive ion-exchange treatments are required as in the case of silica hydrosols. Silica-alumina hydrogels containing a major proportion by weight of silica may also be employed.

It will be apparent from the foregoing that the major objective of this invention is to provide economical methods for preparing high-silica Y sieve zeolites useful as catalyst bases for hydrocracking, isomerization and other acid-catalyzed reactions. A direct objective is to eliminate the expensive silica hydrosol as a necessary raw material in the manufacture of these high-silica zeolites. Another objective is to provide more direct and economical methods for using inexpensive sodium silicate as the major raw material. Other objectives will be apparent from the description which follows.

The silica hydrogel which forms the major raw material herein should be washed substantially free of contaminating salts such as chlorides, sulfates, etc., which may have been formed during the gelation from sodium silicate by acidification. Its water content may range anywhere from about 40% to 95% or more by weight, and is preferably ground to a fairly fine powder before the peptization step. Where the water content is less than about 40%, it is difficult or impossible to obtain the desired crystalline zeolite.

*Step 1—Peptization.*—In this step the silica hydrogel, or silica-alumina hydrogel, is gently stirred in an aqueous sodium hydroxide solution at ambient temperatures of, e.g., about 10–50° C. for about 10 minutes to 3 hours. Preferred temperatures lie between about 20–30° C., and the other critical variables of water ratios and sodium hydroxide ratios are as follows:

*Table 1*

| Mole-ratio | Operative | Preferred |
|---|---|---|
| $H_2O/Na_2O$ | 30–200 | 50–100 |
| $SiO_2/Na_2O$ | 4–20 | 6–15 |

High temperatures, and $SiO_2/Na_2O$ ratios lower than those specified above, are to be avoided; either of these conditions may result in a relatively more complete peptization of the silica hydrogel, and in this state the subsequent crystallization step fails to yield the desired crystalline zeolite. It should be noted that the above specified $SiO_2/Na_2O$ ratios are higher than any of the ratios found in commercial sodium silicate solutions. It appears necessary that at least about 4 moles of $SiO_2$ be present per mole of $Na_2O$, for only in this range can high molecular weight aggregates of silica be formed (Iler, "The Colloid Chemistry of Silica and Silicates," Cornell University Press, 1955, p. 22).

Severe agitation during the peptization step also seems to cause over-peptization and is to be avoided. Mild stirring as with a paddle or the like is to be preferred.

*Step 2—Crystallization of zeolite.*—This step involves essentially the addition to the peptized silica slurry of additional sodium hydroxide, sodium aluminate and water, followed by a low temperature aging period, and then a relatively high temperature crystallization period. The addition of sodium hydroxide, sodium aluminate and water should be such as to bring the solution within the following composition ranges:

*Table 2*

MOLE-RATIOS OF COMPONENTS FOR CRYSTALLIZATION OF ZEOLITE

|  | Operative | Preferred |
|---|---|---|
| $Na_2O/SiO_2$ | 0.2–0.6 | 0.3–0.5 |
| $SiO_2/Al_2O_3$ | 10–30 | 12–25 |
| $H_2O/Na_2O$ | 25–80 | 35–50 |

After mixing and stirring the added ingredients, the solution is allowed to age at temperatures of about 10–50° C., preferably about room temperature, for about 1–72 hours, preferably 10–50 hours. At the end of this low temperature aging period, the solution is heated to, e.g., 85–110° C., preferably 90–100° C., and allowed to remain at this temperature for about 2–100 hours, preferably about 24–72 hours, during which crystallization of the Y sieve zeolite takes place. Normally, the solution is allowed to remain quiescent during the entire aging period and the crystallization period. The resulting slurry is then filtered, and the crystals are washed with distilled water and dried according to conventional procedures.

The zeolite compositions prepared as above described ordinarily comprise about 35–70% by weight of crystalline material conforming to the X-ray diffraction pattern for Y zeolites. There is in addition a second crystalline material whose major X-ray diffraction "$d$" spacing is about 6.90–6.94 A.

In the data presented herein, the percentage of zeolite Y in the solid product is determined by means of quantitative X-ray and/or adsorption measurements referred to standard zeolite Y samples as follows:

$$\frac{I_1}{I_2} \times 100 = \text{percent zeolite Y}$$

where $I_1$ = sum of intensities of suitable X-ray lines measured on the zeolite Y sample, and $I_2$ = sum of intensities of the same X-ray lines measured on the pure zeolite Y reference standard.

The sodium zeolite crystals prepared as above described are basically three-dimensional frameworks of $SiO_4$ and $AlO_4$ tetrahedra cross-linked by the sharing of oxygen atoms. The electrovalence of each tetrahedron containing aluminum is balanced by the presence in the aluminosilicate framework of a cation such as sodium ion. The void spaces in the framework are occupied by water molecules.

The high silica-to-alumina mole ratio in these zeolites is believed to be due to the substitution in the crystal lattice of $Si^{+4}$ for $Al^{+3}$ ions during the synthesis process. The $Al^{+3}$ ion is larger (radius=0.57 A.) than the $Si^{+4}$ ion (radius=0.39 A.). As the silica/alumina mole-ratio increases, the smaller $SiO_4$ tetrahedra substitute for the larger $AlO_4$ tetrahedra, and there is a small but real decrease in the unit cell volume as indicated by the value of the crystal lattice constant $a_0$. Thus, for zeolite Y compositions having $SiO_2/Al_2O_3$ mole ratios ranging from about 3.9 up to about 6.0 the unit cell constant $a_0$ changes from 24.77 A. to about 24.52 A. If the high $SiO_2/Al_2O_3$ ratios found in these compositions were merely due to the presence of amorphous or non-structural $SiO_2$, no variation in the cell dimension $a_0$ would be observed.

Measurement of the lattice constant $a_0$ by means of careful X-ray spectrometer scanning, therefore provides a reliable method for determining the structural $SiO_2/Al_2O_3$ ratio of zeolite Y products made by the process of the invention, the relationship between the lattice constant and $SiO_2/Al_2O_3$ content having been established.

Because of the observed decrease in unit cell dimensions with increasing $SiO_2/Al_2O_3$ ratio, there is necessarily a small concomitant shift observed in the positions of particular interplanar or $d$-spacings which characterize these zeolite Y compositions, according to the well known relationship for a cubic crystal:

$$d_{h,k,l} = a_0 \sqrt{h^2 + k^2 + l^2}$$

where $h$, $k$ and $l$ are the Miller indices. Occasionally, minor variations in intensities and/or positions of the lines or peaks in the X-ray diffraction patterns of the herein described sodium zeolite Y compositions may be observed, due to variables such as the particular X-ray technique and/or apparatus employed, orientation of the powder crystals, the degree of hydration thereof, etc., but nevertheless they all conform to the pattern essentially as shown in Table 3 below.

The values for interplanar spacing $d$ expressed in Angstrom units (A.). The relative intensity of the lines of the X-ray powder diffraction pattern are expressed on the relative basis of 100 for the strongest peak. The X-ray powder diffraction pattern data of Table 3 was obtained on a Geiger counter spectrometer with pen recorder using filtered copper K-alpha radiation ($\lambda$=1.54050 A.).

*Table 3*

| $h^2+k^2+l^2$ | $d$, A. | Relative Intensity |
|---|---|---|
| 3 | 14.15–14.65 | 100 |
| 8 | 8.67–8.85 | 18 |
| 11 | 7.39–7.53 | 14 |
| 19 | 5.62–5.71 | 42 |
| 27 | 4.72–4.79 | 17 |
| 32 | 4.33–4.40 | 28 |
| 40 | 3.88–3.93 | 8 |
| 43 | 3.74–3.79 | 41 |
| 44 | 3.72–3.75 | 4 |
| 48 | 3.54–3.58 | 3 |
| 51 | 3.43–3.48 | 5 |
| 56 | 3.28–3.32 | 27 |
| 59 | 3.19–3.24 | 6 |
| 67 | 3.00–3.04 | 12 |
| 72 | 2.89–2.93 | 16 |
| 75 | 2.83–2.88 | 35 |
| 70 | 2.74–2.78 | 12 |
| 83 | 2.69–2.73 | 4 |
| 88 | 2.61–2.65 | 11 |
| 91 | 2.57–2.61 | 5 |
| 108 | 2.36–2.39 | 7 |

When the sodium zeolites of this invention are converted to hydrogen zeolites, or to other zeolitic metal forms, they still conform with slight displacements to the above diffraction pattern. The persistence of the same crystal form in the hydrogen zeolites is a distinguishing characteristic of the Y sieve zeolites; the crystal structure of other molecular sieve zeolites, e.g., the X type, completely collapses upon conversion to the hydrogen form.

It is to be observed also that the extraneous non-Y-sieve crystalline material in the compositions of this invention is also stable in its hydrogen form, as is evidenced by persistence of the major extraneous $d$-spacing at about 6.9 A. when such compositions are converted to the hydrogen form.

To convert the sodium zeolites prepared as above described to active hydrocracking and isomerization catalysts, they are subjected to suitable ion-exchange treatments to produce compositions wherein the zeolitic cations are mainly hydrogen and/or a polyvalent metal. The hydrogen zeolites are prepared by ammonium ion-exchange followed by heating, as described in Belgian Patent No. 598,683. The polyvalent metal forms, e.g., magnesium or calcium zeolites, are prepared by ion-exchange with suitable polyvalent metal salts, as described in Belgian Patent No. 598,682. The preferred polyvalent metals are the divalent metals, and particularly the divalent metals of Groups IIA and IIB.

The active hydrogen zeolites, or polyvalent metal zeolites possess the required acid function for cracking and isomerization activity. For purposes of hydrocracking or hydroisomerization, it is necessary to incorporate a minor proportion of a suitable metal hydrogenating component, e.g., a Group VIII metal. The preferred hydrogenating metals comprise the Group VIII noble metals, and particularly palladium, platinum or rhodium. To incorporate these metals by ion-exchange, the zeolite, either in a metal form or the ammonium form, is digested with an aqueous solution of a suitable compound of the desired metal wherein the metal is present in a cationic form, followed by reducing to form the free metal as described for example in Belgian Patent No. 598,686.

The finished catalysts are useful for the hydrocracking of mineral oil fractions boiling between about 300° and 1,000° F., to produce desired lower boiling hydrocarbons, e.g., gasoline, jet fuel, etc. Suitable hydrocracking conditions fall within the general ranges:

*Table 4*

|  | Operative | Preferred |
|---|---|---|
| Temperature, °F | 400–850 | 500–750 |
| Pressure, p.s.i.g | 300–5,000 | 750–2,000 |
| LHSV | 0.1–10 | 0.5–5 |
| $H_2$/oil ratio, s.c.f./b | 1,000–20,000 | 2,000–12,000 |

The following examples are cited to illustrate the invention, but are not to be construed as limiting in scope.

EXAMPLE I (A) *Preparation of silica hydrogel.*—A 1,500 ml. sample of "N" brand sodium silicate (600 grams $SiO_2$) was diluted with 3,500 ml. of water and cooled to 60° F. To this solution was added rapidly with stirring a dilute hydrochloric acid solution prepared by adding 475 ml. concentrated HCl to 4,525 ml. of water and cooling to 60° F. A silica hydrogel was formed in about one minute, the pH being about 4. The resulting gel was broken into small lumps and washed with a total of 4,000 ml. of 0.1 N hydrochloric acid (three separate washes, each time allowing the wash to stand on the gel for about one hour). The hydrogel was then washed free of chloride ion with distilled water and air dried until the water content was reduced to about 63% by weight (loss on ignition at 1,000° F.). The partially dried hydrogel was then ground to a fine powder.

(B) *Peptization of hydrogel.*—To the hydrogel prepared in step (A) was added 1,200 ml. of a water solution containing 76 grams sodium hydroxide, and the mixture was stirred gently for one hour at room temperature. The mole-ratio of $H_2O/Na_2O$ during this period was about 68, and the $SiO_2/Na_2O$ mole-ratio was about 10.

(C) *Crystallization of Y sieve.*—To the slurry from step (B) was added 200 grams of sodium hydroxide and 111 grams of sodium aluminate (Nalco No. 680–containing 46% $Al_2O_3$ and 31% $Na_2O$) dissolved in 633 ml. of water. After stirring well, the mixture was allowed to stand for 24–28 hours at room temperature. The mixture was then heated at 96–98° C. for 48 hours, during which crystallization occurred. The product was recovered by filtration, washed, dried to about 25% water content, and subjected to X-ray diffraction analysis. The intensity of the X-ray pattern indicated that the sample was about 50–60% crystalline Y sieve, the remainder being unidentified crystalline and amorphous material. The unit cell size indicated that the $SiO_2/Al_2O_3$ mole-ratio was about 4.7. The X-ray diffraction pattern was as follows:

*Table 5*

| $h^2+k^2+l^2$ | d, A. | Relative Intensity |
|---|---|---|
| 3 | 14.48 | 100 |
| 8 | 8.82 | 20 |
| 11 | 7.52 | 14 |
| 19 | 5.70 | 43 |
| 27 | 4.77 | 19 |
| 32 | 4.39 | 28 |
| 40 | 3.92 | 9 |
| 43 | 3.78 | 39 |
| 44 | 3.74 | 5 |
| 48 | 3.58 | 3 |
| 51 | 3.46 | --------- |
| 56 | 3.31 | 27 |
| 59 | 3.23 | 6 |
| 67 | 3.03 | 12 |
| 72 | 2.92 | 15 |
| 75 | 2.86 | 31 |
| 80 | 2.77 | 11 |
| 83 | 2.72 | 4 |
| 88 | 2.64 | 10 |
| 91 | 2.60 | 10 |
| 104 | 2.43 | 2 |
| 108 | 2.38 | 7 |

In addition to the foregoing, there were some extraneous lines in the pattern (the major line being at d (A.) 6.94), indicating the presence of another crystalline phase. However, this extraneous material does not interfere substantially with catalytic activity, as will be shown in Example III. It would in fact appear to be a desirable active component in the final catalyst.

EXAMPLE II

The procedure of parts (B) and (C) of Example I was essentially repeated, using instead of a pure silica hydrogel, a silica-alumina hydrogel prepared by reacting aluminum chloride with sodium silicate to give a hydrogel of the composition: $Na_2O \cdot Al_2O_3 \cdot 15SiO_2$, which was dehydrated to about 63% water content. In this case, a crystalline product was obtained in step (C) which analyzed 42% crystalline Y sieve having a $SiO_2/Al_2O_3$ ratio of 4.8.

EXAMPLE III

This example illustrates the preparation and use of hydrocracking catalysts from the sodium zeolites prepared as described in Examples I and II.

(A) *Preparation of hydrogen zeolite.*—A portion of the sodium zeolite prepared in Example I was subjected to exhaustive ion-exchange with aqueous ammonium chloride solution until the $Na_2O$ content was reduced to 1.1% by weight. A portion of the resulting ammonium zeolite was then washed, dried and calcined at 900° F., giving a hydrogen zeolite having a surface area of 519 square meters per gram and exhibiting essentially the same X-ray diffraction pattern as the sodium zeolite.

(B) *Preparation of palladium - magnesium - hydrogen zeolite catalyst.*—The remaining ammonium zeolite from step (A) was ion-exchanged by digesting first with a solution of tetrammine palladium chloride to deposit 0.5% by weight palladium, and was then ion-exchanged with a magnesium chloride solution containing sufficient magnesium ions to replace approximately 35% of the zeolitic ammonium ions (leaving about 50–60% of the ion-exchange sites occupied by ammonium ions), and the resulting product was then filtered, washed, dried and calcined at 900° F. in order to convert remaining ammonium ions to hydrogen ions.

(C) *Activity test of catalyst.*—The catalyst from step (B) was employed for hydrocracking a 400–800° F. boiling range hydrofined gas-oil, the hydrocracking conditions being: Pressure 1,000 p.s.i.g.; 1.5 LHSV; and 8,000 s.c.f. of hydrogen per barrel of feed. Under these conditions, after the catalyst had been on-stream for 30 hours, a 58% conversion to 400° F. endpoint gasoline was obtained at 576° F. A catalyst of the same nominal composition, but prepared by the conventional method via silica hydrosol, gives 55% conversion to gasoline at 572° F. after 50 hours on-stream. Thus, the catalysts prepared from the Y sieve zeolites of this invention are essentially equivalent in activity to catalysts prepared starting with the more expensive silica hydrosol.

It is not intended that the invention should be limited to the details described above since many variations may be made by those skilled in the art without departing from the scope or spirit of the following claims.

I claim:

1. A method for the manufacture of a molecular sieve zeolite of the Y crystal type having a $SiO_2/Al_2O_3$ mole-ratio greater than about 3.9, which comprises:
   (A) subjecting a preformed, precipitated hydrogel which is predominantly silica to partial peptization by mild agitation for about 10 minutes to 3 hours at a temperature between about 10° and 50° C. in an aqueous sodium hydroxide solution wherein the $SiO_2/Na_2O$ mole-ratio is between about 4 and 20 and the $H_2O/Na_2O$ mole-ratio is between about 30 and 200;
   (B) adding additional water, sodium hydroxide and sodium aluminate to the peptized slurry from step (A) to provide a crystallization mixture wherein the molar ratios of components are within the following ranges:

$Na_2O/SiO_2$ _____ 0.2–0.6
   $SiO_2/Al_2O_3$ _____ 10–30
   $H_2O/Na_2O$ _____ 25–80

(C) allowing the crystallization mixture from step (B) to age at a temperature between about 10° and 50° C. for a period of time between about 1 and 72 hours;
   (D) heating the aged mixture from step (C) and allowing it to age at a temperature between about 85° and 110° C. for about 2 to 100 hours to effect crystallization; and
   (E) recovering from the resulting slurry a crystalline solid comprising a substantial proportion of a Y molecular sieve zeolite conforming to the general formula:

$$0.9 \pm 0.2 Na_2O : Al_2O_3 : wSiO_2 : xH_2O$$

wherein $w$ is a number from about 3.9 to 5.5 and $x$ is a number from about 0 to 9.

2. A method as defined in claim 1 wherein said hydrogel is a substantially pure silica hydrogel having a water content of at least about 40% by weight.

3. A method as defined in claim 1 wherein said hydrogel is a silica-alumina hydrogel having a water content of at least about 40% by weight.

4. A method as defined in claim 1 wherein the molar ratios of components in the crystallization mixture from step (B) fall within the following ranges:

$Na_2O/SiO_2$ _____ 0.3–0.5
   $SiO_2/Al_2O_3$ _____ 12–25
   $H_2O/Na_2O$ _____ 35–50

5. A crystalline, zeolitic alumino-silicate composition of matter comprising (1) a substantial proportion of a molecular sieve of the Y crystal type having a $SiO_2/Al_2O_3$ mole-ratio between about 3.9 and 5.5, and (2) a second crystalline zeolite whose X-ray diffraction pattern includes a major "$d$" spacing at about 6.90–6.94A., said composition having been prepared by a process comprising the procedure defined in claim 1.

6. A catalyst having active acidic and hydrogenating functions comprising (1) a major proportion of a crystalline zeolite alumino-silicate composition as defined in claim 5 and wherein the zeolitic cations are mainly selected from the class consisting of hydrogen and divalent metals, and (2) a minor proportion of a Group VIII metal hydrogenating component.

7. A method for the manufacture of a molecular sieve zeolite of the Y crystal type having a $SiO_2/Al_2O_3$ mole-ratio greater than about 3.9, which comprises:
   (A) acidifying an aqueous sodium silicate solution to a pH below about 10 so as to precipitate a silica hydrogel;
   (B) washing the hydrogel from step (A) to remove soluble salts;
   (C) partially drying the hydrogel from step (B) to a water content of about 40–95% by weight;
   (D) subjecting the hydrogel from step (C) to partial peptization by mild agitation for about 10 minutes to 3 hours at a temperature between about 10° and 50° C. in an aqueous sodium hydroxide solution wherein the $SiO_2/Na_2O$ mole-ratio is between about 4 and 20 and the $H_2O/Na_2O$ mole-ratio is between about 30 and 200;
   (E) adding additional water, sodium hydroxide and sodium aluminate to the peptized slurry from step (D) to provide a crystallization mixture wherein the molar ratios of components are within the following ranges:

$Na_2O/SiO_2$ _____ 0.2–0.6
   $SiO_2/Al_2O_3$ _____ 10–30
   $H_2O/Na_2O$ _____ 25–80

(F) allowing the crystallization mixture from step (E) to age at a temperature between about 10° and 50° C. for a period of time between about 1 and 72 hours;
   (G) heating the aged mixture from step (F) and allowing it to age at a temperature between about 85° and 110° C. for about 2 to 100 hours to effect crystallization; and
   (H) recovering from the resulting slurry a crystalline solid comprising a substantial proportion of a Y molecular sieve zeolite conforming to the general formula:

$$0.9 \pm 0.2 Na_2O : Al_2O_3 : wSiO_2 : xH_2O$$

wherein $w$ is a number from about 3.9 to 5.5 and $x$ is a number from about 0 to 9.

8. A method as defined in claim 7 wherein the molar ratios of components in the crystallization mixture from step (E) fall within the following ranges:

$Na_2O/SiO_2$ _____ 0.3–0.5
   $SiO_2/Al_2O_3$ _____ 12–25
   $H_2O/Na_2O$ _____ 35–50

References Cited by the Examiner

UNITED STATES PATENTS

| | | | |
|---|---|---|---|
| 2,882,244 | 4/1959 | Milton | 212—455 |
| 2,983,670 | 5/1961 | Seubold | 208—110 |
| 3,130,006 | 4/1964 | Rabo et al. | 23—110 |
| 3,130,007 | 4/1964 | Breck | 23—113 |
| 3,140,251 | 7/1964 | Plank et al. | 208—120 |

FOREIGN PATENTS 1,098,929   2/1961   Germany.

DELBERT E. GANTZ, *Primary Examiner.*

DANIEL E. WYMAN, ALPHONSO D. SULLIVAN,
*Examiners.*